(12) United States Patent
Gutmann et al.

(10) Patent No.: US 12,179,574 B2
(45) Date of Patent: Dec. 31, 2024

(54) FILLING DEVICE FOR A PRESSURE VESSEL OF A MOTOR VEHICLE AND MOTOR VEHICLE HAVING A PRESSURE VESSEL AND A FILLING DEVICE

(71) Applicant: Bayerische Motoren Werke Aktiengesellschaft, Munich (DE)

(72) Inventors: Timo Gutmann, Bad Kohlgrub (DE); Heiko Walther, Welden (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/027,987

(22) PCT Filed: Sep. 22, 2021

(86) PCT No.: PCT/EP2021/076012
§ 371 (c)(1),
(2) Date: Mar. 23, 2023

(87) PCT Pub. No.: WO2022/063804
PCT Pub. Date: Mar. 31, 2022

(65) Prior Publication Data
US 2023/0364986 A1    Nov. 16, 2023

(30) Foreign Application Priority Data
Sep. 23, 2020   (DE) ..................... 10 2020 124 742.7

(51) Int. Cl.
*B60K 15/03* (2006.01)
*B60K 15/04* (2006.01)
(52) U.S. Cl.
CPC .... *B60K 15/03006* (2013.01); *B60K 15/0406* (2013.01); *B60K 2015/03019* (2013.01)

(58) Field of Classification Search
CPC .......... B60K 15/03006; B60K 15/0406; B60K 2015/03019
(Continued)

(56) References Cited

U.S. PATENT DOCUMENTS

2002/0112779 A1   8/2002   Ono et al.
2012/0248114 A1   10/2012  Langemann
2019/0001813 A1   1/2019   Stahl

FOREIGN PATENT DOCUMENTS

DE      32 12 689 A1    10/1983
DE      102 06 921 A1   9/2002
(Continued)

OTHER PUBLICATIONS

WO-2017153485-A1 (Stahl, H) (Sep. 14, 2017) (Machine Translation) (Year: 2017).*
(Continued)

*Primary Examiner* — Mahmoud Gimie
(74) *Attorney, Agent, or Firm* — Crowell & Moring LLP

(57) ABSTRACT

A filling device for a pressure vessel of a motor vehicle includes a filling neck via which an operating medium can be filled into a pressure vessel, a dust cap which can be plugged onto the filling neck and which, together with the filling neck, delimits a filling volume. A housing apparatus includes a main element and a cover element which can be adjusted relative to the main element between an open position and a closed position which, together with the main element, delimits a housing interior. The dust cap is arranged in the housing interior. At least one ventilation channel, which is delimited in regions by the dust cap, extends from the filling volume into an environment separated from the housing interior by way of the cover in its closed position and has at least one direction-reversing element.

15 Claims, 2 Drawing Sheets

(58) Field of Classification Search
 USPC .................................................. 141/311 R
 See application file for complete search history.

(56) References Cited

FOREIGN PATENT DOCUMENTS

| | | |
|---|---|---|
| DE | 10 2005 012 572 A1 | 8/2005 |
| DE | 10 2016 203 941 A1 | 9/2017 |
| DE | 10 2017 001 039 A1 | 8/2018 |
| DE | 10 2017 208 419 A1 | 11/2018 |
| EP | 2 505 413 B1 | 9/2014 |
| WO | WO 2011/101004 A1 | 8/2011 |
| WO | WO-2017153485 A1 * | 9/2017 ......... B60K 15/0406 |

OTHER PUBLICATIONS

International Search Report (PCT/ISA/210) issued in PCT Application No. PCT/EP2021/076012 dated Dec. 23, 2021 with English translation (five (5) pages).

German-language Written Opinion (PCT/ISA/237) issued in PCT Application No. PCT/EP2021/076012 dated Dec. 23, 2021 (six (6) pages).

German-language Search Report issued in German Application No. 10 2020 124 742.7 dated Sep. 10, 2021 with partial English translation (10 pages).

* cited by examiner

FILLING DEVICE FOR A PRESSURE VESSEL OF A MOTOR VEHICLE AND MOTOR VEHICLE HAVING A PRESSURE VESSEL AND A FILLING DEVICE

BACKGROUND AND SUMMARY

The technology disclosed herein relates to a filling device for a pressure vessel of a motor vehicle, and to a motor vehicle having a pressure vessel and a filling device.

Documents WO 2011/101004 A1, DE 10 2017 001 039 A1, and EP 2 505 413 B1 are part of the prior art.

It is a preferred object of the technology disclosed herein to minimize or eliminate at least one disadvantage of a known solution, or to propose an alternative solution. A preferred object of the technology disclosed herein is in particular, while avoiding an introduction of dirt into a pressure vessel of a motor vehicle, to enable a gas exchange between a filling volume of a filling device for the pressure vessel and the environment of a motor vehicle that comprises the filling device and the pressure vessel. Further preferred objects can be derived from the advantageous effects of the technology disclosed herein.

The object described is achieved by the subject matter of the independent patent claims. The dependent patent claims represent preferred design embodiments.

The technology disclosed herein relates to a filling device for a pressure vessel of a motor vehicle, having a filler neck by way of which an operating medium of the motor vehicle is able to be filled into a vessel interior of the pressure vessel. The pressure vessel is thus an operating medium vessel, in particular a fuel tank, of the motor vehicle. The pressure vessel is able to be filled with the operating medium of the motor vehicle by way of the filler neck. The operating medium is able to be stored in the pressure vessel and able to be provided for an operating medium processing installation, for example an internal combustion engine of the motor vehicle. The filler neck has a valve by way of which the vessel interior is able to be fluidically separated from a filling volume. The operating medium is able to be filled into the vessel interior of the pressure vessel by way of the filling volume. In order to prevent the operating medium escaping from the vessel interior of the pressure vessel, the valve is provided by means of which the vessel interior is to be spatially separated from the filling volume so as to avoid the operating medium from the vessel interior leaking into an environment of the motor vehicle by way of the filling volume. It is furthermore provided that the filling device comprises a dust cap which is able to be attached to the filler neck and which, conjointly with the filler neck, delimits the filling volume. Ingress of dust and/or contamination into the filling volume can be precluded by delimiting the filling volume by means of the dust cap. It is furthermore provided that the filling device comprises a housing installation which comprises a main element and a cover element that is adjustable relative to the main element between an open position and a closed position, the latter conjointly with the main element delimiting a housing interior, wherein the dust cap is disposed in the housing interior. In particular, the main element provides a so-called tank recess into which the filler neck can open such that the pressure vessel is able to be filled with the operating medium by way of the tank recess. The tank recess is able to be delimited, in particular closed, by means of the cover element, the latter being in particular a filler cap. The filler neck and the dust cap can thus be protected in relation to weather influences by means of the housing installation. The filling device furthermore has at least one ventilation duct which in regions is delimited by the dust cap and in this way at least in regions extends through the dust cap. The ventilation duct extends from the filling volume into an environment that by means of the cover element in the closed position thereof is separated from the housing interior, and has at least one direction reversal. The ventilation duct here has the direction reversal along the longitudinal extent of the former. The filling volume is able to be vented into an environment of the motor vehicle by way of the ventilation duct. In this way, liquid can be transported by means of gas, in particular air, from the filling volume into the environment of the motor vehicle by way of the at least one ventilation duct while venting of the filling volume takes place at the same time. As a result, the filling volume can be dried, or be kept dry, by way of the at least one ventilation duct. An outflow of gas from the filling volume into the environment of the motor vehicle is made possible by way of the at least one direction reversal of the ventilation duct, an ingress of liquid and/or dirt into the filling volume by way of the ventilation duct being avoided or at least impeded. As a result, the filling volume can be particularly reliably protected in relation to contaminations, simultaneous venting of the filling volume being made possible as a result thereof. The at least one direction reversal of the ventilation duct is understood to mean that a first direction vector of a flow in the ventilation duct in a first longitudinal region encloses an angle of more than or equal to 90° in relation to a section direction vector of the flow in a second longitudinal region of the ventilation duct.

In a refinement of the technology disclosed herein it is provided that the at least one direction reversal of the ventilation duct is disposed in the dust cap. This means that a portion of the ventilation duct that extends through the dust cap has the direction reversal along the longitudinal extent of the former. Ingress of dust and/or contamination into the filling volume can at least be substantially avoided by way of the at least one direction reversal of the ventilation duct in the dust cap.

In a further design embodiment of the technology disclosed herein it is provided that the at least one direction reversal of the ventilation duct is disposed in the cover element. This means that the first longitudinal portion and the second longitudinal portion, which have the direction vectors of the flow that are able to pass through the respective longitudinal portions and that enclose the mutual angle of more than or equal to 90°, are disposed in the cover element of the housing installation. As a result, an ingress of dust or contamination into the filling volume by way of the ventilation duct, which extends through the cover element, can at least be substantially avoided. The ventilation duct here, at least over a longitudinal portion, is delimited by the cover element or formed by the cover element. Furthermore, ingress of dust and/or contamination into a region of the ventilation duct that extends through the dust cap can at least be substantially avoided as a result of the at least one direction reversal of the ventilation duct in the cover element.

In a further design embodiment of the technology, it has proven advantageous for the ventilation duct to have a labyrinth-type profile. This labyrinth-type profile can be provided by the at least one direction reversal, in particular by a plurality of direction reversals. Ingress of contaminations into the filling volume by way of the ventilation duct can be avoided in a particularly reliable manner by means of the plurality of direction reversals of the labyrinth-type profile of the ventilation duct.

In a further design embodiment of the technology disclosed herein it has proven advantageous for the dust cap on the cover element to be held by way of a connection element, the ventilation duct extending through the latter. By way of the connection element the dust cap can be held, or mounted, on the cover element so as to be movable relative to the cover element. The connection element can be elastically configured so as to enable a relative mobility of the dust cap in relation to the cover element. In particular, the connection element is made by additive manufacturing. The connection element makes it possible that the ventilation duct extends through the dust cap, from the dust cap to the cover element by way of the connection element, and from the cover element into an environment of the motor vehicle. In this way, the ventilation duct makes possible a targeted ventilation of the filling volume into the environment of the motor vehicle, this being guided by way of the connection element.

In a further design embodiment of the technology disclosed here, it has proven advantageous for the ventilation duct in regions to run through the cover element and to open into the environment by way of an opening which is disposed on a first external side of the cover element that faces the environment, or on a second external side of the cover element that faces a gap between the one lateral frame of the motor vehicle and the cover element. This means that the ventilation duct opens into the environment of the motor vehicle by way of the opening. Consequently, a gas exchange between the environment and the ventilation duct can take place by way of the opening. If the opening is disposed on the external side of the cover element that faces the gap, the opening is particularly well obscured such that the opening, in a view from the outside onto the motor vehicle, is particularly poorly visible. Furthermore, a particularly minor introduction of dirt into the ventilation duct can be achieved as a result, because the respective contaminations first enter the gap and would subsequently have to enter the ventilation duct by way of the opening which is disposed on the external side of the cover element that faces the gap.

It has furthermore proven advantageous for at least one fresh air duct and at least one exhaust air duct to be provided as respective ventilation ducts. This means that gas, in particular air, from the environment of the motor vehicle can flow to the filling volume by way of the at least one fresh air duct, and gas, in particular air, from the filling volume can flow out by way of the at least one exhaust air duct and by way of the at least one exhaust air duct can be guided into the environment of the motor vehicle. In this way, venting of the filling volume is made possible, on the one hand, and a pressure equalization between the filling volume and the environment can be ensured, on the other hand. The at least one fresh air duct and the at least one exhaust air duct make it possible in particular that gas, in particular air, from the environment of the motor vehicle can flow into the filling volume, and the gas, or the air, from the filling volume can flow out into the environment of the motor vehicle, thus enabling the filling volume to be passed through by a flow of gas, in particular air, as a result of which liquid disposed in the filling volume can be received by means of the gas, in particular the air, flowing through the filling volume and be transported out of the filling volume by means of the gas, in particular the air. As a result, the liquid can be released from the filling volume and the latter can be dried, in particular.

In a further design embodiment of the technology disclosed herein it has proven advantageous for a membrane to delimit the ventilation duct at least in regions. In particular, the membrane delimits the ventilation duct at least in a longitudinal portion of the ventilation duct that is delimited by the cover element. Furthermore, the membrane delimits the ventilation duct in particular in relation to the housing interior and thus in relation to the tank recess. When the ventilation duct is passed through by a flow of the gas, in particular the air, liquid disposed in the housing interior can be received by way of the membrane and be transported away, in particular into the environment of the motor vehicle, by means of the gas flowing through the ventilation duct. It is particularly advantageous here for the membrane to be configured so as to be gas-permeable and liquid-impermeable. The membrane can in particular be a so-called semi-permeable membrane. The semi-permeable membrane makes it possible for an exchange of gas between the ventilation duct and the housing interior to take place, whereas a liquid exchange between the housing interior and the ventilation duct is precluded. As a result, an introduction of liquid into the housing interior by way of the ventilation duct can be avoided, and the housing interior can simultaneously be dried when the ventilation duct is passed through by a flow of gas, in particular air, in that liquid vapor from the housing interior passes through the membrane and in the ventilation duct is transported away, in particular into an environment of the motor vehicle, by the gas flowing through the ventilation duct.

It has furthermore proven advantageous for at least one filter element to be provided, wherein the at least one filter element is disposed so as to separate an entry opening of the ventilation duct from an exit opening of the ventilation duct. This means that gas, in particular air, flowing from the entry opening to the exit opening has to pass through the at least one filter element. Dirt and/or liquid and/or dust can be filtered out by means of the at least one filter element. The entry opening is in particular separated from the filling volume by means of the at least one filter element, as a result of which ingress of contaminations and liquid into the filling volume can be at least substantially avoided by means of the filter element.

The technology disclosed herein furthermore relates to a motor vehicle having a pressure vessel, in particular an operating medium vessel, and a filling device as has already been disclosed in the context of the filling device described above. The pressure vessel is able to be filled with an operating medium, in particular a fuel, by way of the filling device, wherein the filling volume by way of the at least one ventilation duct is fluidically connected to an environment of the motor vehicle. The filling volume is able to be vented by way of the at least one ventilation duct, as a result of which liquid and/or gas is able to be transported away from the filling volume. Advantages and advantageous refinements of the filling device described are to be considered advantages and advantageous refinements of the motor vehicle described, and vice versa.

In other words, the technology disclosed herein relates to a ventilation opening for a filler neck of a hydrogen tank or of any other gas tank as an operating medium vessel, wherein the ventilation opening is integrated in a hinge arm of a fuel filler flap, the latter being the cover element. A filler neck of gas-powered vehicles is typically protected against the ingress of dust and dirt by a dust protection cap. This dust protection cap is attached to the filler neck before the fuel filler flap is closed. Minor leakages of the fuel, in particular of the gas, that is filled into the pressure vessel can exit the filler neck and despite the dust protection cap make their way into a closed installation space between the tank recess and the fuel filler flap, presently the housing interior. This installation space is thus consciously to be designed to be untight so that the exiting fuel, in particular the gas, can be diluted. Liquid which accumulates in the filler neck after a fueling procedure can be trapped by the dust protection cap and in conventional motor vehicles can potentially not dry and freeze. The dust protection cap cannot be released when refueling, or water can be forced into the pressure vessel.

These disadvantages can be at least substantially avoided by the described filling device for the motor vehicle. The motor vehicle is in particular an automobile. Alternatively or additionally, the motor vehicle can in particular be a gas-powered vehicle or a hydrogen-powered vehicle. A seal plug, presently the dust cap, is here flexibly fastened to a hinge arm of the fuel filler flap, presently of the cover element. The seal plug delimits circumferentially the at least one ventilation duct at least over a longitudinal region of the ventilation duct such that the ventilation duct extends through the seal plug. The ventilation duct provides a venting possibility between the filling volume and an interior of the hinge arm. The hinge arm on the inside is preferably of a hollow design, the hinge arm in particular delimiting the ventilation duct at least over a longitudinal region. The hinge arm has the at least one ventilation duct which in regions is formed by a labyrinth-shaped passage and which by way of an external skin of the motor vehicle, or by way of a gap between a lateral frame and the cover element, can open out into the environment of the motor vehicle. The at least one opening by way of which the ventilation duct opens into the environment of the motor vehicle can be disposed in a flap surface of the cover element, in particular in the region of a scoop or an aerodynamic geometry which has in particular a NACA profile. Alternatively or additionally, the at least one opening by way of which the at least one ventilation duct opens into the environment of the motor vehicle can be disposed within the gap between the cover element and the lateral frame. The at least one ventilation duct can be protected in relation to invading moisture or splash water by means of the membrane, in particular the gas-permeable and liquid-impermeable membrane, or by means of a non-woven fabric in an air routing in the hinge arm, in particular within the longitudinal portion of the at least one ventilation duct that extends through the hinge arm. In this way, the at least one membrane and/or a valve can be provided in the at least one ventilation duct. A position of the at least one opening by way of which the at least one ventilation duct opens into the environment of the motor vehicle can be adapted as a function of a pressure distribution on an external skin of the motor vehicle and/or to a pressure distribution within the tank recess. Alternatively or additionally, at least one fresh air duct and at least one exhaust air duct can be provided as a plurality of ventilation ducts. When the housing interior is closed by placing the cover element on the main element, the seal plug can rest on the filler neck and tightly close off the filling volume conjointly with the filler neck in relation to an environment. Water and leaking gas from the filling volume can evaporate by way of the at least one ventilation duct. The labyrinth geometry of the at least one ventilation duct protects the filling volume in relation to invading water and dust from the environment of the motor vehicle. A particularly advantageous venting effect when the motor vehicle is in motion can be achieved by adjusting a respective position of the at least one opening by way of which the at least one ventilation duct opens into the environment of the motor vehicle in the external skin.

The technology disclosed herein will now be explained by means of the figures.

DETAILED DESCRIPTION OF THE DRAWINGS

Figure 1:
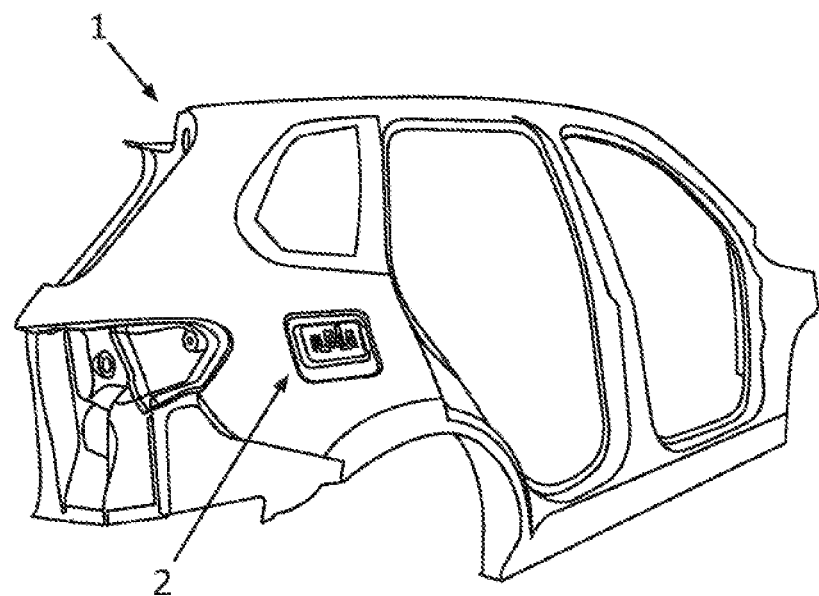
FIG. 1 is a schematic illustration of a lateral frame of a motor vehicle, presently of an automobile, wherein a filling device by way of which a pressure vessel of the motor vehicle is able to be filled with an operating medium is integrated in the lateral frame.
Figure 2:
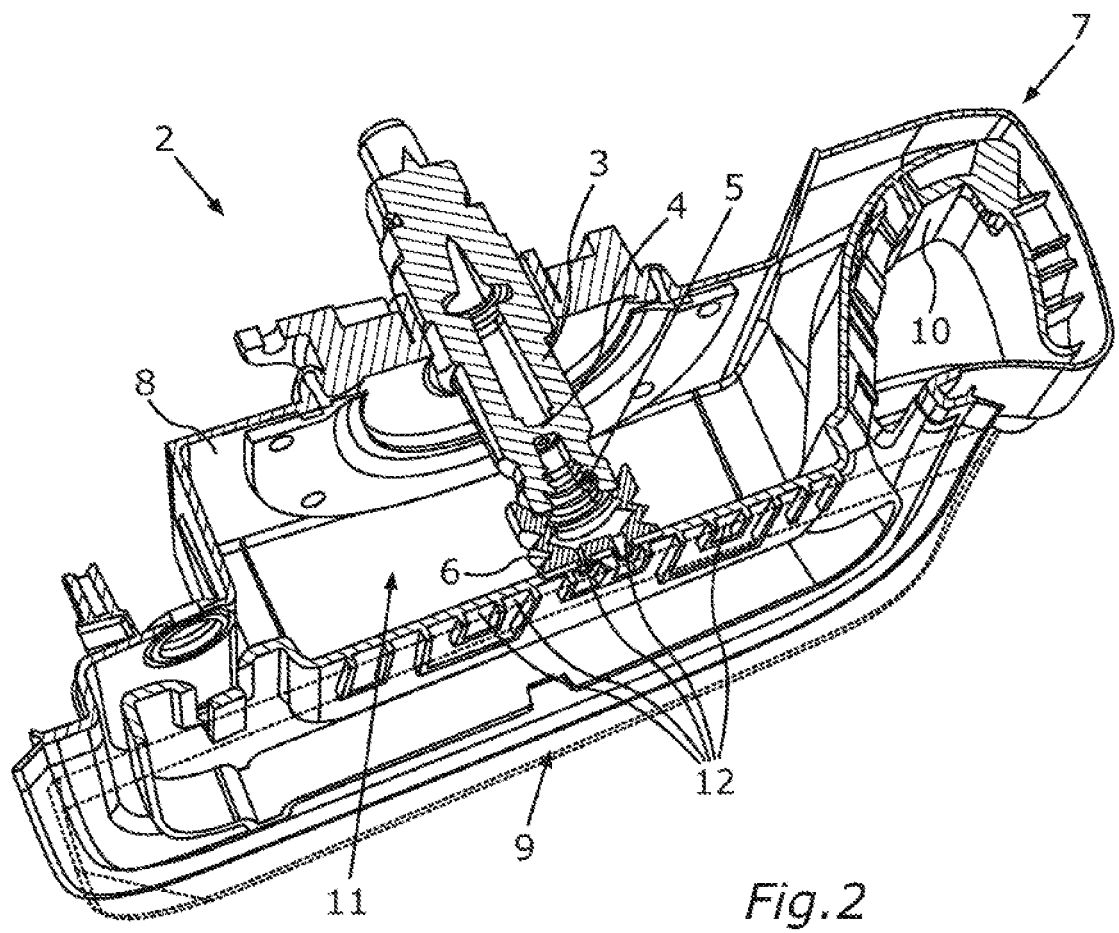
FIG. 2 is a schematic illustration of a section through the filling device that has a filler neck by way of which the pressure vessel is able to be filled with the operating medium, a dust cap which in regions can be inverted over the filler neck, a housing installation which provides a tank recess and which encloses a housing interior in which the dust cap is disposed, and at least one ventilation duct which at least in regions extends through a cover element of the housing installation that closes off the housing interior and by way of which a filling volume enclosed by the filler neck and the dust cap is able to be ventilated.
Figure 3:
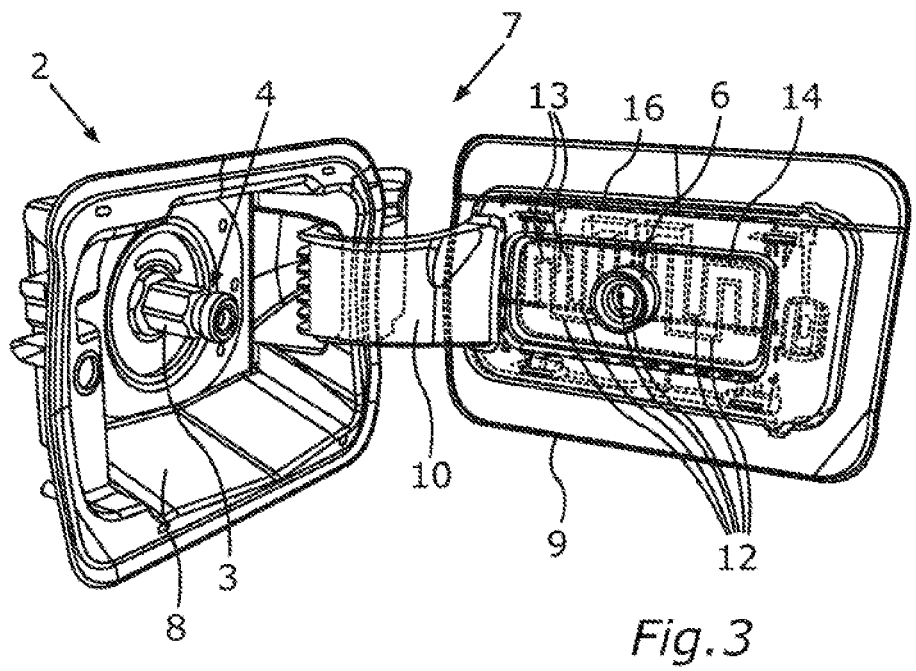
FIG. 3 is a schematic illustration of a perspective view of the filling device, having the cover element which by way of a hinge arm is held on a main element of the housing installation, wherein the at least one ventilation duct in regions extends through the cover element and additionally at least in regions can extend through the hinge arm.
Figure 4:
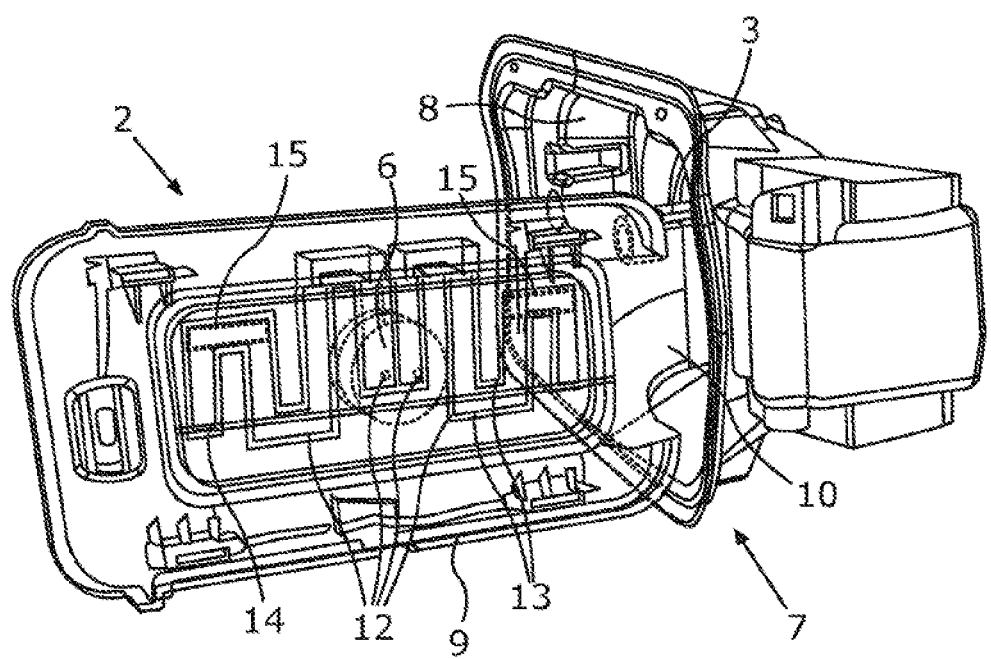
FIG. 4 is a further schematic illustration of the filling device, wherein the dust cap is held on the cover element and is disposed so as to be fixed relative to the cover element.

Shown in FIG. 1 is a lateral frame 1 of a motor vehicle, presently of an automobile. A filling device 2 is integrated in the lateral frame 1, wherein an operating medium is able to be filled into a pressure vessel of the automobile by way of the filling device 2. This filling device 2 is shown in a schematic sectional view in FIG. 2, and in FIGS. 3 and 4 is shown in respective perspective views that differ from one another. The filling device 2 comprises a filler neck 3 by way of which the operating medium is able to be filled into the pressure vessel. In particular, the filler neck 3 at one end is fluidically connected to the pressure vessel of the motor vehicle, and at the other end has a free end which is able to be connected to an operating medium supply installation. In this way, the operating medium of the motor vehicle is able to be filled in a vessel interior of the pressure vessel by way of the filler neck 3. As can be seen in FIG. 2, the filler neck 3 has a valve 4 by means of which the vessel interior of the pressure vessel is able to be fluidically separated from a filling volume 5. The filling device 2 furthermore comprises a dust cap 6 which is presently a seal plug. The dust cap 6 is able to be attached to, or inverted over, a free end of the filler neck 3. The dust cap 6 conjointly with the filler neck 3 delimits the filling volume 5.

The filling device 2 furthermore comprises a housing installation 7 which comprises a main element 8 and a cover element 9. The cover element 9 by way of a hinge arm 10 is held on the main element 8 so as to be movable relative to the main element 8. The main element 8 provides a tank recess in which the filler neck 3 is disposed at least in regions. The cover element 9, by means of the hinge arm 10, is adjustable relative to the main element 8 between an open position and a closed position which conjointly with the main element 8 delimits a housing interior 11. When the cover element 9 is disposed in the closed position, the dust cap 6 is disposed in this housing interior 11. In the closed position of the cover element 9, the filling volume 5 by means of the dust cap 6 is sealed, in particular fluidically sealed, in relation to the housing interior 11. As is illustrated in the figures, the dust cap 6 can be held directly on the cover element 9 and in particular be fixed to the cover element 9. Alternatively, the dust cap 6 can be held on the cover element 9 by way of a connection element. The connection element here can in particular be configured so as to be movable and/or elastic, as a result of which a relative movement of the dust cap 6 in relation to the cover element 9 is made possible by means of the connection element.

In order to enable venting of the filling volume 5 and thus transporting away of gas and/or liquid from the filling volume 5, at least one ventilation duct 12 which from the filling volume 5 extends into an environment of the automobile is provided. Presently the at least one ventilation duct 12 in regions extends through the dust cap 6 and in regions through the cover element 9. This ventilation duct 12 has at least one direction reversal, presently a plurality of direction reversals, and thus a labyrinth-type profile. The plurality of direction reversals are presently provided in a longitudinal region of the at least one ventilation duct 12, the latter extending through the cover element 9. This means that the at least one ventilation duct 12 in the cover element 9 has the labyrinth-type structure. Alternatively or additionally, the at least one ventilation duct 12 in the longitudinal region thereof that extends through the dust cap 6 can have the at least one direction reversal.

At least one fresh air duct 13 and at least one exhaust air duct 14 are presently provided as the plurality of ventilation ducts 12, wherein each fresh air duct 13 and each exhaust air duct 14 opens into the environment of the automobile by way of a respective assigned opening. A positive pressure may prevail in the at least one fresh air duct 13, whereas a negative pressure may prevail in the at least one exhaust air duct 14 during forward travel of the automobile. The respective openings by way of which the at least one fresh duct 13 and the at least one exhaust air duct 14 open into the environment of the automobile can be disposed on a first external side of the cover element 9 that faces the environment. Alternatively, at least one of the openings by way of which the at least one fresh air duct 13 or the at least one exhaust air duct 14 opens into the environment of the automobile can be disposed on a second external side of the cover element 9 that faces a gap between the main element 8 and the cover element 9, or faces a gap between the housing installation 7 and the lateral frame 1 of the automobile and delimits this gap in regions. Furthermore alternatively, at least one of the openings by way of which the at least one fresh air duct 13 or the at least one exhaust air duct 14 open into the environment of the automobile can be provided in the hinge arm 10.

In order to avoid ingress of contaminations and/or liquid and/or insects into the at least one fresh air duct 13 or at least one exhaust air duct 14, at least one filter element 15 shown in dashed lines in FIG. 4 can be provided. This at least one filter element 15 covers a cross section of the respective fresh air duct 13 or exhaust air duct 14 to be protected. For this purpose, the at least one filter element 15 can be disposed in the respective fresh air duct 13 or in the respective exhaust air duct 14, or cover the respective opening of the respective fresh air duct 13 or of the respective exhaust air duct 14 that opens into the environment of the automobile toward the environment of the automobile and thus toward the outside. Presently, two filter elements 15 are schematically illustrated with boxes using dashed lines.

As is schematically illustrated by a box in FIG. 3, the filling device 2 can have a membrane, presently a semipermeable membrane 16, which is configured so as to be permeable to gas and impermeable to liquids. This membrane 16 covers the at least one ventilation duct 12, across the longitudinal portion extending through the cover element 9, toward the housing interior 11. The membrane 16 here delimits the longitudinal regions of the at least one ventilation duct 12 that extend in the cover element 9. In this way, a gas exchange between the at least one longitudinal region of the at least one ventilation duct 12 that extends through the cover element 9 and the housing interior 11 is possible by way of the membrane 16, as a result of which the housing interior 11 can be degassed, in particular dried, by way of the at least one ventilation duct 12. Ingress of liquid or contamination from the housing interior 11 into the at least one ventilation duct 12 can at least be substantially avoided by way of the membrane 16. The membrane 16 can be adhesively bonded and/or welded to the cover element 9. Water trapped in the housing interior 11 can escape the housing interior 11 by way of the membrane 16, and be transported away and guided into the environment of the automobile by means of the air flowing through the at least one ventilation duct 12.

The at least one filter element 15 is in particular specified to separate an entry opening of the at least one ventilation duct 12 from an exit opening of the at least one ventilation duct 12. The filter element 15 can in particular serve as a protection against spiders. The at least one fresh air duct 13 and/or the at least one exhaust air duct 14 along the longitudinal extent thereof can in each case have the labyrinth-type profile.

Active purging of the at least one ventilation duct 12 with air can take place during forward travel of the automobile. The air here can be conveyed through the at least one ventilation duct 12 in particular by forming a positive pressure in the at least one fresh air duct 13, and by forming a negative pressure in the at least one exhaust air duct 14. In particular, the at least one fresh air duct 13 guides air from the environment of the automobile into the filling volume 5. The at least one exhaust air duct 14 is specified to discharge air from the filling volume 5 into the environment of the automobile. The dust cap 6, by way of a fluidic connection between the longitudinal region of the at least one ventilation duct 12 that extends through the cover element 9 and the filling volume 5, has at least one connection duct, wherein the at least one connection duct is part of the at least one entire ventilation duct 12. The at least one ventilation duct 12, in particular within the cover element 9, can in regions have a thickening which provides an air reservoir for the temporary storage of air. This in particular planar air reservoir can be configured so as to be round or angular.

Overall, the technology disclosed herein demonstrates how a ventilation installation for venting the filling volume 5, which in regions is delimited by the filler neck 3, is made possible in the filling device 2, wherein a pressurized gas is able to be filled into the pressure vessel of the automobile by way of the filler neck 3. In particular, the automobile that has the filling device 2 can have the filling device 2 as well as the pressure vessel by means of which the operating medium for operating the automobile is able to be provided. The operating medium is in particular a fuel by means of which the automobile is able to be driven.

The term "substantially" (e.g. "substantially vertical axis") in the context of the technology disclosed herein comprises in each case the exact property, or the exact value (e.g. "vertical axis") and in each case deviations which are irrelevant in terms of the function of the property/of the value (e.g. "tolerable deviation from the vertical axis").

The above description of the present invention is for illustrative purposes only and is not intended to limit the invention. Various variants and modifications are possible within the scope of the invention, without departing from the scope of the invention and its equivalents.

LIST OF REFERENCE SIGNS

1 Lateral frame
2 Filling device
3 Filler neck
4 Valve
5 Filling volume
6 Cap
7 Housing installation
8 Main body
9 Cover
10 Hinge arm
11 Housing interior
12 Ventilation duct
13 Fresh air duct
14 Exhaust air duct
15 Filter element
16 Membrane

The invention claimed is:

1. A filling device for a pressure vessel of a motor vehicle, comprising:
a filler neck by way of which an operating medium of the motor vehicle is able to be filled into a vessel interior of the pressure vessel and which has a valve by which the vessel interior is able to be fluidically separated from a filling volume;
a dust cap which is attachable to the filler neck and which, conjointly with the filler neck, delimits the filling volume;
a housing installation which comprises a main body and a cover that is adjustable relative to the main body between an open position and a closed position, the cover conjointly with the main body delimiting a housing interior, wherein the dust cap is disposed in the housing interior; and
at least one ventilation duct which is delimited in regions by the dust cap, extends from the filling volume into an environment separated from the housing interior by way of the cover in its closed position and has at least one direction-reversing element, the at least one ventilation duct extending in regions through the dust cap.

2. The filling device according to claim 1, wherein the at least one direction reversal element of the ventilation duct is disposed in the dust cap.

3. The filling device according to claim 1, wherein the at least one direction reversal element of the ventilation duct is disposed in the cover.

4. The filling device according to claim 1, wherein the ventilation duct has a labyrinth-type profile.

5. The filling device according to claim 1, wherein the dust cap on the cover is held by way of a connection element, and
the ventilation duct extends through the connection element.

6. The filling device according to claim 1, wherein the ventilation duct in regions runs through the cover and opens into the environment by way of an opening which is disposed on a first external side of the cover that faces the environment, or on a second external side of the cover that faces a gap between the main body and the cover.

7. The filling device according to claim 1, wherein at least one fresh air duct and at least one exhaust air duct are provided as respective ventilation ducts.

8. The filling device according to claim 1, wherein a membrane delimits the ventilation duct at least in regions.

9. The filling device according to claim 1, wherein a filter is disposed so as to separate an entry opening of the ventilation duct from an exit opening of the ventilation duct.

10. The filling device of claim 1, wherein, when the dust cap is attached to the filler neck and the valve fluidically separating the vessel interior from the filling volume is open, the ventilation duct is in fluid communication with the vessel interior.

11. A motor vehicle, comprising:
a pressure vessel; and
a filling device by way of which the pressure vessel is able to be filled with an operating medium, the filling device comprising:
a filler neck by way of which an operating medium of the motor vehicle is able to be filled into a vessel interior of the pressure vessel and which has a valve by which the vessel interior is able to be fluidically separated from a filling volume;
a dust cap which is attachable to the filler neck and which, conjointly with the filler neck, delimits the filling volume;
a housing installation which comprises a main body and a cover that is adjustable relative to the main body between an open position and a closed position, the cover conjointly with the main body delimiting a housing interior, wherein the dust cap is disposed in the housing interior; and
at least one ventilation duct which is delimited in regions by the dust cap, extends from the filling volume into an environment separated from the housing interior by way of the cover in its closed position and has at least one direction-reversing element,
wherein the filling volume, by way of the at least one ventilation duct, is fluidically connected to the environment of the motor vehicle, the at least one ventilation duct extending in regions through the dust cap.

12. The motor vehicle of claim 11, wherein, when the dust cap is attached to the filler neck and the valve fluidically separating the vessel interior from the filling volume is open, the ventilation duct is in fluid communication with the vessel interior.

13. The motor vehicle according to claim 11, wherein the at least one direction reversal element of the ventilation duct is disposed in the dust cap.

14. The motor vehicle according to claim 11, wherein a membrane delimits the ventilation duct at least in regions.

15. The motor vehicle according to claim 11, wherein a filter is disposed so as to separate an entry opening of the ventilation duct from an exit opening of the ventilation duct.

* * * * *